(12) United States Patent
Fukuyama et al.

(10) Patent No.: US 7,308,174 B2
(45) Date of Patent: Dec. 11, 2007

(54) OPTICAL DEVICE INCLUDING A FILTER MEMBER FOR DIVIDING A PORTION OF SIGNAL LIGHT

(75) Inventors: Masashi Fukuyama, Inuyama (JP); Yasunori Iwasaki, Nishikasugai-Gun (JP); Akiyoshi Ide, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/156,315

(22) Filed: Jun. 17, 2005

(65) Prior Publication Data

US 2005/0238279 A1   Oct. 27, 2005

Related U.S. Application Data

(63) Continuation-in-part of application No. PCT/JP03/16349, filed on Dec. 19, 2003, and a continuation-in-part of application No. 10/732,203, filed on Dec. 10, 2003, now abandoned.

(60) Provisional application No. 60/435,105, filed on Dec. 20, 2002.

(30) Foreign Application Priority Data

Dec. 20, 2002   (JP) ............................. 2002-370751
Jan. 20, 2003   (JP) ............................. 2003-011560
Jun. 2, 2003   (JP) ............................. 2003-157201

(51) Int. Cl.
   *G02B 6/30*   (2006.01)
(52) U.S. Cl. ........................... 385/49; 385/14; 385/45; 385/50; 385/88

(58) Field of Classification Search .................. 385/14, 385/37, 45, 46, 49, 50, 88, 89
See application file for complete search history.

(56) References Cited

U.S. PATENT DOCUMENTS 4,165,496 A   8/1979   Di Domenico, Jr. et al.
4,756,590 A   7/1988   Forrest et al.

(Continued)

FOREIGN PATENT DOCUMENTS

EP   0 840 150 A2   5/1998

(Continued)

OTHER PUBLICATIONS

Co-pending U.S. Appl. No. 11/156,324, filed Jun. 17, 2005, Fukuyama et al.

(Continued)

*Primary Examiner*—Hemang Sanghavi
(74) *Attorney, Agent, or Firm*—Burr & Brown

(57) ABSTRACT

When a surface of a filter member on a multilayer film is defined as a first surface, a surface of the filter member on an quartz substrate as a second surface, an inner wall surface of a slit which faces the first surface of the filter member as a first inner wall surface, and an inner wall surface of the slit which faces the second surface of the filter member as a second inner wall surface, one or more of the first inner wall surface and the second inner wall surface of the slit, and the second surface of the filter member do not lie parallel to the first surface of the filter member.

14 Claims, 18 Drawing Sheets

U.S. PATENT DOCUMENTS

| | | | |
|---|---|---|---|
| 4,989,338 A | 2/1991 | Tsuji et al. | |
| 5,150,438 A | 9/1992 | Brown | |
| 5,452,387 A | 9/1995 | Chun et al. | |
| 5,497,438 A | 3/1996 | Ishikawa et al. | |
| 5,499,309 A | 3/1996 | Kozuka et al. | |
| 5,535,296 A | 7/1996 | Uchida | |
| 5,771,322 A | 6/1998 | Matsumoto et al. | |
| 5,793,106 A | 8/1998 | Yasukawa et al. | |
| 5,930,423 A | 7/1999 | Chen et al. | |
| 6,027,253 A | 2/2000 | Ota et al. | |
| 6,075,911 A | 6/2000 | Goto | |
| 6,085,000 A * | 7/2000 | Tanaka et al. | 385/45 |
| 6,118,915 A | 9/2000 | Sato | |
| 6,250,820 B1 | 6/2001 | Melchior et al. | |
| 6,282,352 B1 | 8/2001 | Kato et al. | |
| 6,304,708 B1 | 10/2001 | Fukuyama et al. | |
| 6,327,407 B1 | 12/2001 | Mitsuda et al. | |
| 6,344,248 B1 | 2/2002 | Suga | |
| 6,406,196 B1 | 6/2002 | Uno et al. | |
| 6,476,379 B2 | 11/2002 | Ando et al. | |
| 6,626,584 B2 | 9/2003 | Fujita et al. | |
| 6,784,764 B2 | 8/2004 | Kadota et al. | |
| 6,793,410 B2 | 9/2004 | Nakanishi et al. | |
| 6,803,639 B2 | 10/2004 | Ono et al. | |
| 6,819,840 B2 | 11/2004 | Tohgoh et al. | |
| 2001/0024553 A1 | 9/2001 | Nakanishi et al. | |
| 2003/0044119 A1 | 3/2003 | Sasaki et al. | |
| 2003/0095756 A1 | 5/2003 | Tohgoh et al. | |
| 2004/0042728 A1 | 3/2004 | Ito et al. | |
| 2004/0086231 A1 | 5/2004 | Fukuyama et al. | |

FOREIGN PATENT DOCUMENTS

| | | |
|---|---|---|
| EP | 0 844 503 A1 | 5/1998 |
| EP | 0 908 746 | 4/1999 |
| EP | 0 943 941 A1 | 9/1999 |
| EP | 0 994 171 A2 | 4/2000 |
| EP | 1 063 542 A1 | 12/2000 |
| EP | 1 312 960 A1 | 5/2003 |
| FR | 2 549 243 | 1/1985 |
| JP | 62-056908 | 3/1987 |
| JP | 63-191111 A | 8/1988 |
| JP | 63-205611 | 8/1988 |
| JP | 63-249118 | 10/1988 |
| JP | 64-023206 A1 | 1/1989 |
| JP | 64-42610 A | 2/1989 |
| JP | 2-15203 A | 1/1990 |
| JP | 2-96609 | 4/1990 |
| JP | 02-113708 | 4/1990 |
| JP | 3-103804 A | 4/1991 |
| JP | 03-271706 | 12/1991 |
| JP | 04-152306 | 5/1992 |
| JP | 04-308804 | 10/1992 |
| JP | 05-203830 A1 | 8/1993 |
| JP | 06-075137 | 3/1994 |
| JP | 6-103821 A1 | 4/1994 |
| JP | 06-331837 | 12/1994 |
| JP | 7-104146 A | 4/1995 |
| JP | 07-104148 | 4/1995 |
| JP | 7-159658 A | 6/1995 |
| JP | 07-234345 | 9/1995 |
| JP | 07-294742 A1 | 11/1995 |
| JP | 8-179128 A1 | 7/1996 |
| JP | 08-179171 | 7/1996 |
| JP | 8-213427 | 8/1996 |
| JP | 09-021912 A1 | 1/1997 |
| JP | 9-033729 A1 | 2/1997 |
| JP | 09-061664 A1 | 3/1997 |
| JP | 09-101435 | 4/1997 |
| JP | 09-105824 A1 | 4/1997 |
| JP | 9-120014 | 5/1997 |
| JP | 09-186348 A1 | 7/1997 |
| JP | 10-062660 | 3/1998 |
| JP | 10-133054 | 5/1998 |
| JP | 10-186182 | 7/1998 |
| JP | 10-227953 | 8/1998 |
| JP | 10-293219 | 11/1998 |
| JP | 10-300936 | 11/1998 |
| JP | 10-307221 A1 | 11/1998 |
| JP | 10-325917 | 12/1998 |
| JP | 11-133255 | 5/1999 |
| JP | 11-142690 | 5/1999 |
| JP | 11-248954 | 9/1999 |
| JP | 2000-009953 | 1/2000 |
| JP | 2000-249874 A | 9/2000 |
| JP | 2000-347050 | 12/2000 |
| JP | 2001-100063 A1 | 4/2001 |
| JP | 2001-102684 | 4/2001 |
| JP | 2001-513216 | 8/2001 |
| JP | 2001-264594 A1 | 9/2001 |
| JP | 2002-182051 A | 6/2002 |
| JP | 2002-343983 A1 | 11/2002 |
| JP | 2003-107301 A1 | 4/2003 |
| JP | 2003-156665 A1 | 5/2003 |
| JP | 2003-294992 A1 | 10/2003 |
| WO | 97/06458 | 2/1997 |
| WO | 02/31547 | 4/2002 |

OTHER PUBLICATIONS

Co-pending U.S. Appl. No. 11/156,298, filed Jun. 17, 2005, Fukuyama et al.

K. Motoki et al., "Connecting Technology of Anisotropic Conductive Materials," Fujikura Giho, No. 99, Oct. 2000, pp. 32-38 (with partial translation of pertinent portion thereof).

Co-pending U.S. Appl. No. 11/288,936, filed Nov. 29, 2005, Fukuyama et al.

* cited by examiner

OPTICAL DEVICE INCLUDING A FILTER MEMBER FOR DIVIDING A PORTION OF SIGNAL LIGHT

CROSS REFERENCE TO RELATED APPLICATIONS

This application is a continuation-in-part of International Application No. PCT/JP2003/016349, having an international filing date of Dec. 19, 2003, which designated the United States, and is a continuation-in-part of U.S. application Ser. No. 10/732,203, filed Dec. 10, 2003, now abandoned and which claims the benefit under 35 USC §119(e) of U.S. Provisional Application Ser. No. 60/435,105, filed Dec. 20, 2002, the entireties of which are incorporated herein by reference.

BACKGROUND OF THE INVENTION

1. Field of the Invention

The present invention relates to an optical fiber array having one or more optical fibers or an optical device having one or more optical waveguides, and more particularly to an optical device suitable for monitoring signal light while it is being propagated through such optical transmitting means.

2. Description of the Related Art

For the present optical communication technology, it is important to monitor communication quality. Particularly, the monitoring of optical output plays an important role in the field of the wavelength multiplex communication technology.

In recent years, there have been growing demands for smaller sizes, higher performance, and lower costs in the optical output monitoring technology.

Heretofore, there has been proposed a technology disclosed in Japanese Laid-Open Patent Publication No. 2001-264594, for example. According to the proposed technology, as shown in FIG. 18, an optical fiber 202 is placed in a V-shaped groove in a glass substrate 200, and then a slit 204 is formed obliquely (to the optical axis) in and across the optical fiber 202. A light reflecting base (filter member) 206 is inserted into the slit 204, with the gap filled with an ultraviolet-curable resin (adhesive) 208. The filter member 206 has a substrate 210 and a multilayer film 212 formed on the principal surface of the substrate 210. The multilayer film 212 is designed to match the refractive index of the substrate 210 and the refractive index of the resin 208 that fills the slit 204.

Of signal light 214 propagated through the optical fiber 202, a light component (reflected light) 216 reflected by the filter member 206 is extracted out of the cladding. The reflected light 216 is detected by a photodetector to monitor the signal light 214.

Heretofore, the slit 204 comprises a parallel groove. An inner wall surface of the slit 204, a principal surface of the filter member 206 (a surface facing the multilayer film 212), surfaces of the substrate 210 of the filter member 206, and another wall surface of the slit 204 lie parallel to each other.

Since the refractive index of the optical fiber 202 and the refractive index of the resin 208 are different from each other, and the refractive index of the substrate 210 of the filter member 206 and the refractive index of the resin 208 are different from each other, reflected lights 226, 228, 230 occur from a first interface 220 between the slit 204 and the resin 208, an interface 222 between the substrate 210 of the filter member 206 and the resin 208, and a second interface 224 between the slit 204 and the resin 208, respectively.

Generally, because the resin 208 which fills the slit 204 also has a function to match refractive indexes, the difference between the refractive indexes of the optical fiber 202 and the resin 208 is small. Therefore, the output of the reflected lights 226, 228, 230 due to the small refractive index difference is several tens dB smaller than the input light (the signal light 214). However, since light is of a wave nature, it causes interference.

Though the reflected lights 226, 228, 230 due to the refractive index difference are of small power, they affect the characteristics of the reflected light 216 because they are emitted in directions which are substantially the same as the direction in which the reflected light 216 from the multilayer film 212 of the filter member 206 is emitted. Furthermore, the arrangement for dividing light with the filter member 206 that is inserted in the slit 204 formed obliquely to the optical axis is problematic in that the characteristics of the reflected light 216 from the filter member 206 tend to interfere with the reflected lights 226, 228, 230 from the first and second interfaces 220, 224, etc.

SUMMARY OF THE INVENTION

It is an object of the present invention to provide an optical device which is capable of reducing interference of reflected light from a multilayer surface of a filter member with light reflected by other portions thereof and of improving the reliability of a monitoring function to monitor signal light.

According to the present invention, there is provided an optical device comprising light transmitting means, a slit defined in the light transmitting means, a filter member inserted in the slit for dividing a portion of signal light propagated through the light transmitting means, and a resin filling a gap between the slit and the filter member within the slit, the filter member having a substrate and an optical thin film disposed on a principal surface of the substrate, wherein when the surface of the filter member on the optical thin film is defined as a first surface, the surface of the filter member on the substrate as a second surface, the inner wall surface of the slit which faces the first surface of the filter member as a first inner wall surface, and the inner wall surface of the slit which faces the second surface of the filter member as a second inner wall surface, one or more of the first inner wall surface and the second inner wall surface of the slit, and the second surface of the filter member do not lie parallel to the first surface of the filter member.

Light reflected (divided) by a surface not parallel to the first surface of the filter member, among the first inner wall surface of the slit, the second inner wall surface of the slit, and the second surface of the filter member, is emitted in a direction which is different from the direction in which light reflected (divided) by the first surface of the filter member is emitted. Therefore, the interference of the reflected light from the first surface is reduced. The reduced interference leads to an improvement in the reliability of a monitoring function to monitor the signal light.

The optical thin film on the principal surface of the filter member may be of a single layer, but is often an optical thin film optimally designed as a multilayer film. The principal surface of the filter member may be disposed not only on a light entrance side, but also on a light exit side.

The angle formed between the two surfaces which do not lie parallel to each other should preferably be 0.5° or greater. If the angle is less than 0.5°, the interference of the reflected light from the first surface cannot be preferably reduced.

In the above arrangement, when a line segment which is formed when the first surface of the filter member and a vertical plane including the optical axis of the signal light cross each other, a line segment which is formed when the second surface of the filter member and the vertical plane cross each other, a line segment which is formed when the first inner wall surface of the slit and the vertical plane cross each other, and a line segment which is formed when the second inner wall surface of the slit and the vertical plane cross each other are defined respectively as a first line segment, a second line segment, a third line segment, and a fourth line segment, one or more of the second line segment, the third line segment, and the fourth line segment may not lie parallel to the first line segment.

Alternatively, the first line segment and the second line segment may not lie parallel to each other, the third line segment and the fourth line segment may not lie parallel to each other, and the first line segment and the third line segment may not lie parallel to each other.

Alternatively, the first line segment and the second line segment may lie parallel to each other, the third line segment and the fourth line segment may lie parallel to each other, and the first line segment and the third line segment may not lie parallel to each other.

Alternatively, the first line segment and the second line segment may not lie parallel to each other, the third line segment and the fourth line segment may lie parallel to each other, and the first line segment and the third line segment may not lie parallel to each other.

Alternatively, the first line segment and the second line segment may lie parallel to each other, the third line segment and the fourth line segment may not lie parallel to each other, and the first line segment and the third line segment may not lie parallel to each other.

When a line segment which is formed when the first surface of the filter member and a horizontal plane including the optical axis of the signal light cross each other, a line segment which is formed when the second surface of the filter member and the horizontal plane cross each other, a line segment which is formed when the first inner wall surface of the slit and the horizontal plane cross each other, and a line segment which is formed when the second inner wall surface of the slit and the horizontal plane cross each other are defined respectively as a fifth line segment, a sixth line segment, a seventh line segment, and an eighth line segment, one or more of the sixth line segment, the seventh line segment, and the eighth line segment may not lie parallel to the fifth line segment.

Alternatively, the seventh line segment and the eighth line segment may lie parallel to each other, and the fifth line segment and the seventh line segment may not lie parallel to each other.

According to the present invention, there is also provided an optical device comprising a plurality of light transmitting means, a slit defined commonly in the light transmitting means, a filter member inserted in the slit for dividing a portion of signal light propagated through each of the light transmitting means, and a resin filling a gap between the slit and the filter member within the slit, the filter member having a curved surface facing at least the slit.

With the above arrangement, the surface of the slit which faces the filter member and the surface of the filter member which faces the slit do not lie parallel to each other, and the face and reverse sides of the filter member do not lie parallel to each other, across the plural light transmitting means. Therefore, the interference of light reflected from the face side of the filter member is reduced. The reduced interference leads to an improvement in the reliability of a monitoring function to monitor the signal light.

According to the present invention, there is further provided an optical device comprising light transmitting means, a slit defined in the light transmitting means, a filter member inserted in the slit for dividing a portion of signal light propagated through the light transmitting means, and a resin filling a gap between the slit and the filter member within the slit, the filter member having a substrate and an optical thin film disposed on a principal surface of the substrate, wherein when the surface of the filter member on the optical thin film is defined as a first surface, the surface of the filter member on the substrate as a second surface, the inner wall surface of the slit which faces the first surface of the filter member as a first inner wall surface, and the inner wall surface of the slit which faces the second surface of the filter member as a second inner wall surface, at least the second surface of the filter member comprises a rough surface.

Usually, light reflected from the first surface of the filter member suffers strong interference with light reflected from the second surface of the filter member depending on the thickness, etc. of the filter member. According to the present invention, however, since the second surface of the filter member comprises a rough surface, light reflected from the second surface of the filter member is randomly emitted as scattered light, the interference with light reflected from the first surface of the filter is reduced.

With the above arrangement, each of the first inner wall surface and the second inner wall surface of the slit may comprise a rough surface for effectively reducing the interference caused by light reflected from the first inner wall surface and the second inner wall surface of the slit.

The rough surface should preferably have a surface roughness Rt in the range of $0.05 \ \mu m \leq Rt \leq 2 \ \mu m$.

With the above arrangement, at least the filter member may have a bottom surface partly held in contact with a bottom of the slit. The filter member can be kept at a desired angle simply by holding a portion of the bottom surface of the filter member in contact with the bottom of the slit, and the optical device can easily be assembled.

As described above, the optical device according to the present invention is capable of reducing the interference of the reflected light from the multilayer surface of the filter member with the other reflected light, and improving the reliability of the monitoring function to monitor the signal light.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Embodiments in which an optical device according to the present invention is applied to a 4-ch in-line power monitoring module, for example, will be described below with reference to FIGS. 1 through 17.

Figure 1:
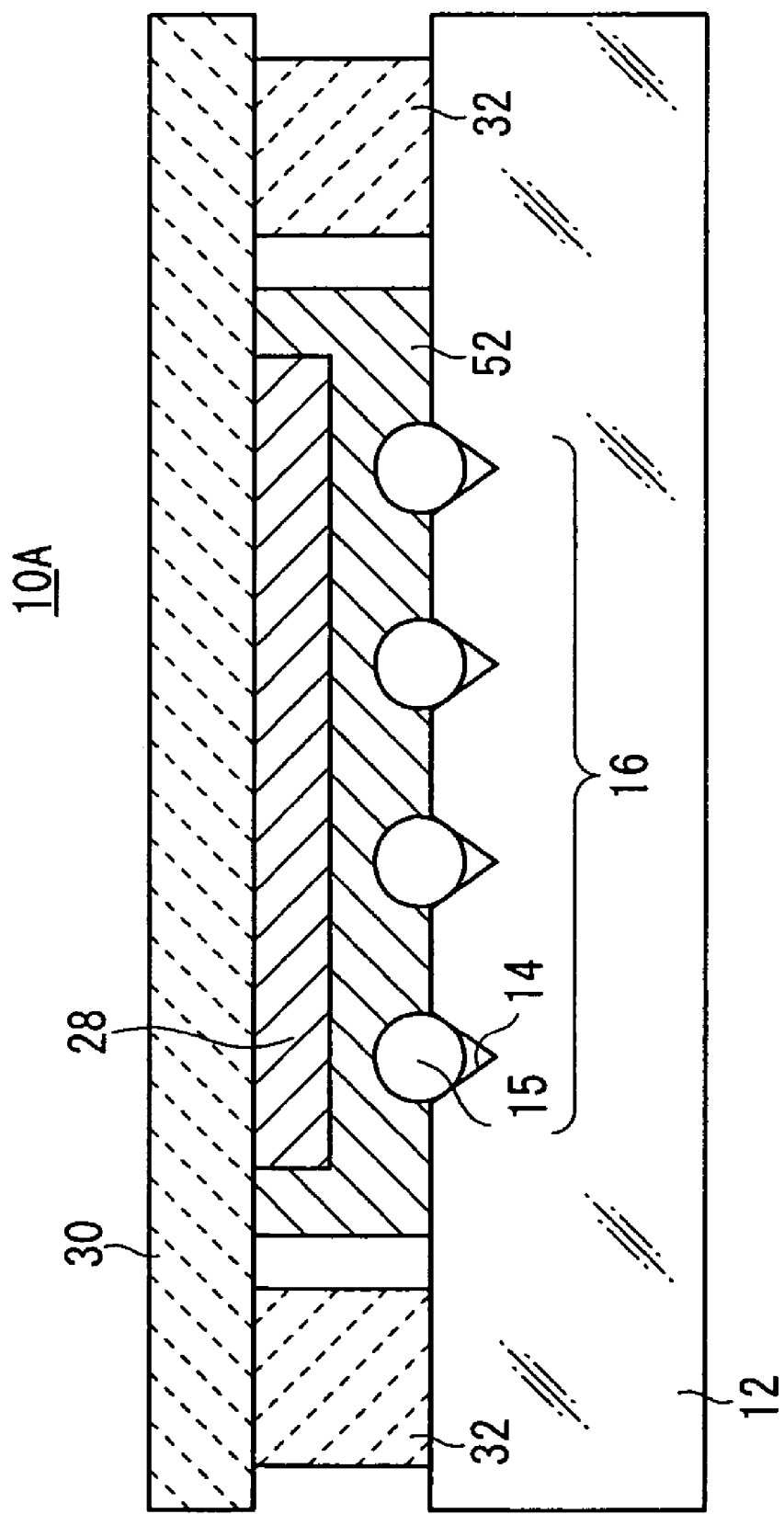
FIG. 1 is a sectional front elevational view of an optical device according to a first embodiment.
Figure 2:
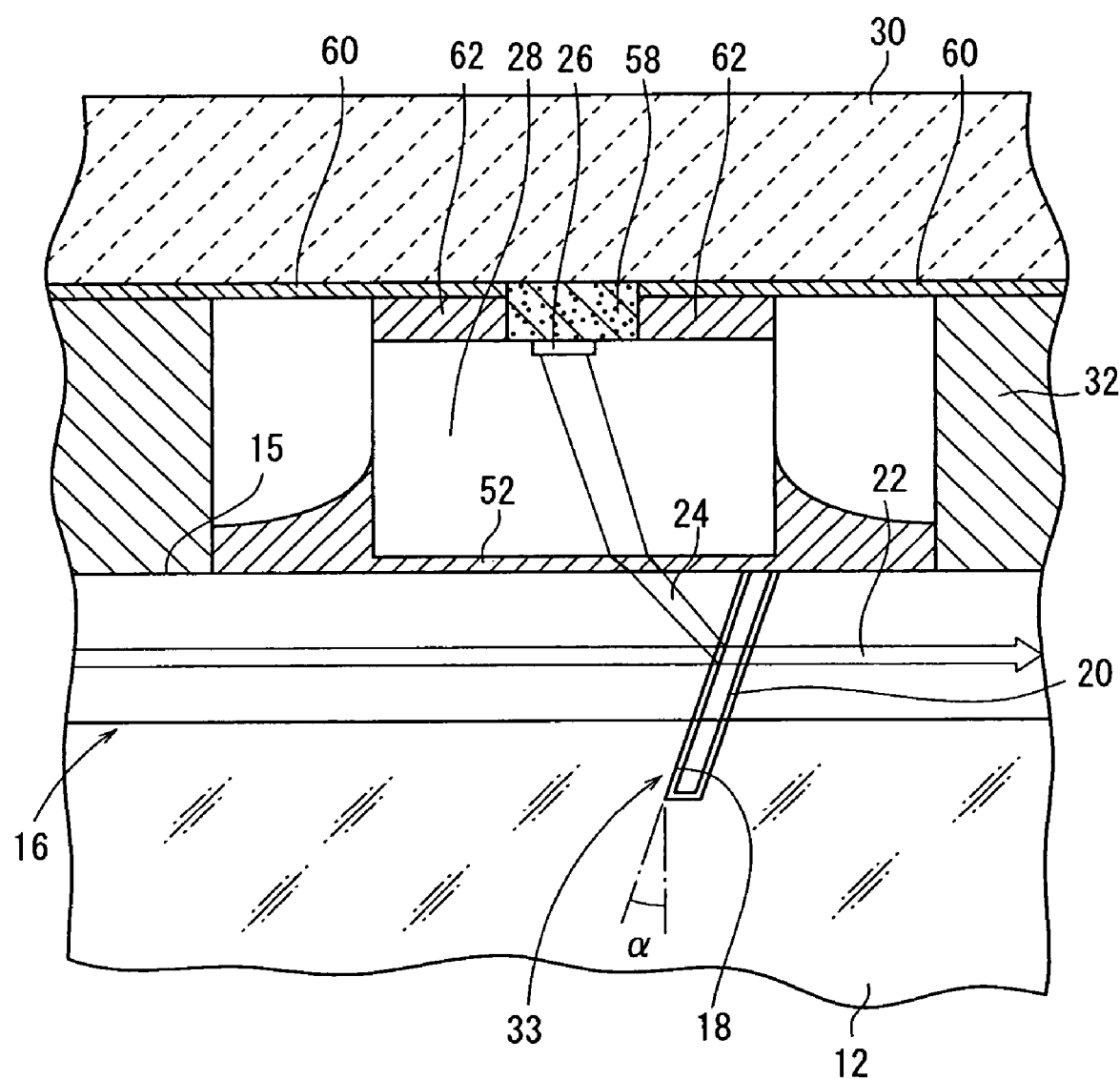
FIG. 2 is a sectional side elevational view of the optical device according to the first embodiment.
Figure 3:
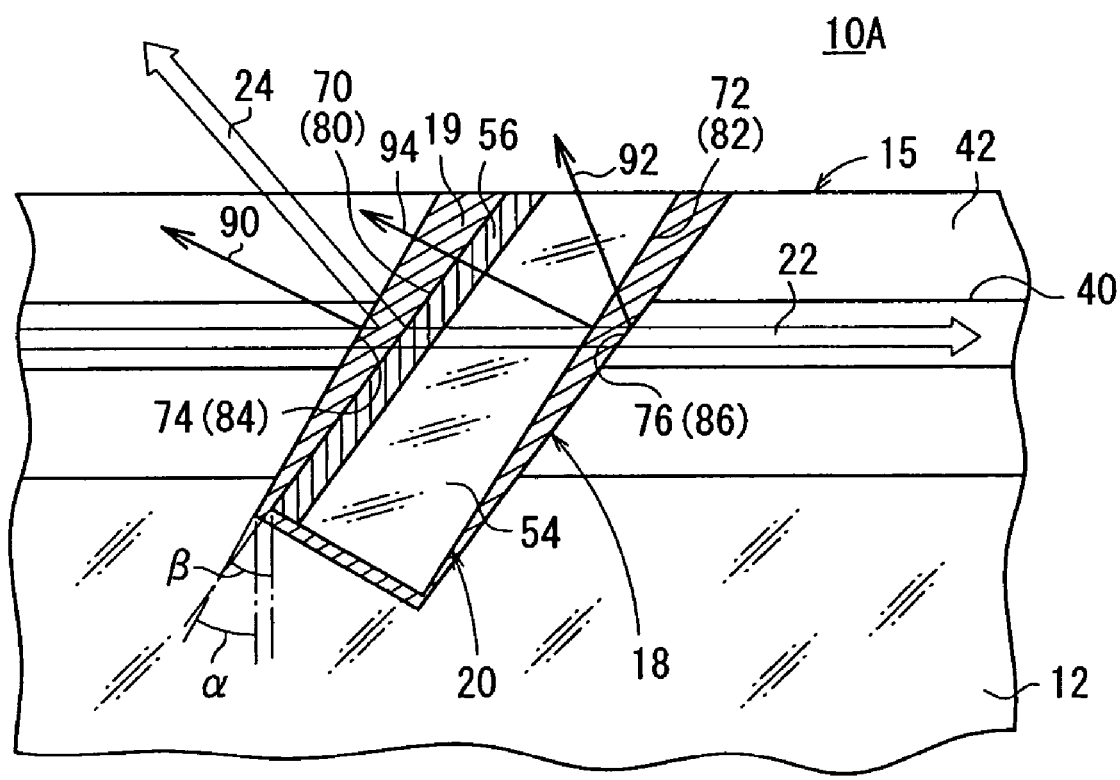
FIG. 3 is an enlarged fragmentary cross-sectional view of the optical device according to the first embodiment.

As shown in FIGS. 1 and 2, an optical device 10A according to a first embodiment has a glass substrate 12, an optical fiber array 16 comprising a plurality of optical fibers 15 fixed in a plurality of V-shaped grooves 14 defined in the glass substrate 12, a slit 18 (see FIG. 2) extending from respective upper surfaces of the optical fibers 15 into the glass substrate 12, a dividing member (filter member) 20 (see FIG. 2) inserted in the slit 18, a PD (PhotoDiode) array 28 having a plurality of active layers 26 for detecting light (reflected light) 24 reflected by at least the filter member 20, of signal light 22 passing through the optical fibers 15, a submount 30 fixing the PD array 28 so as to face the optical fiber array 16, and a spacer 32 for stably fixing at least the PD array 28. Two end faces of the slit 18 and face and reverse sides of the filter member 20 function as a divider 33 (see FIG. 2) for dividing part of signal light 22 that passes through the optical fibers 15. As shown in FIG. 3, each of the optical fibers 15 has a core 40 and a cladding 42.

Stated otherwise, the optical device 10A according to the first embodiment has the glass substrate 12 with the V-shaped grooves 14 defined therein, the optical fiber array 16 fixed in the V-shaped grooves in the glass substrate 12 and providing a light dividing function (the slit 18, the filter member 20, etc.) to each of the optical fibers 15, the PD array 28 securely mounted by an adhesive layer 52 on an optical path of divided light 24 generated by at least the light dividing function, outside of the cladding of each of the optical fibers 15, and the submount 30 on which the PD array 28 is mounted. The submount 30 is disposed such that the mounting surface of the submount 30 faces the glass substrate 12.

In this embodiment, the optical fiber array 16 comprises a plurality of optical fibers 15, and "each of the optical fibers 15" means "each of the four optical fibers 15". However, since even one optical fiber 15 can make up the optical fiber array 16, "each of the optical fibers" or "a plurality of optical fibers" may read as "a single optical fiber".

The angle of the V-shaped grooves 14 defined in the glass substrate 12 should preferably be 45° or greater in view of the load which will be applied to each of the optical fibers 15 of the optical fiber array 16 when the slits 18 will subsequently be formed. The angle should also preferably be 95° or less to provide a sufficient amount of adhesive (=bonding strength) in order to produce a lid-free optical fiber array. In the first embodiment, the angle is 70°.

The optical fiber array 16 is fixed to the glass substrate 12 by placing the optical fiber array 16 in the V-shaped grooves 14, applying an ultraviolet-curable adhesive, and then applying an ultraviolet radiation from the reverse side of the optical fiber array 16 and from above the optical fiber array 16 to cure the adhesive.

The tilt angle $\alpha$ (see FIG. 2) of the slit 18, i.e., the angle between the slit 18 and the vertical plane, should preferably range from 15° to 25°. If the tilt angle $\alpha$ is too small, then the divided light 24 from the filter member 20 spreads too widely, resulting in increased crosstalk when the optical device is used in multichannel applications. If the tilt angle $\alpha$ is too large, then divided light 24 from the filter member 20 has increased polarization dependency, tending to result in degraded characteristics.

As shown in FIG. 3, the filter member 20 comprises a quartz substrate 54 and a dividing multilayer film 56 disposed on a principal surface of the quartz substrate 54. In view of the ease with which to handle the filter member 20, the filter member 20 may be made of a plastic material, a high-polymer material, or a polyimide material. However, since the tilt angle $\alpha$ of the slit 18 is large, i.e., it is in the range from 15° to 25°, the filter member 20 should preferably be made of a material having the same refractive index as the optical fibers 15 (quartz) in order to prevent the optical axis of transmitted light from being displaced due to refraction.

The gap between the slit 18 and the filter member 20 within the slit 18 is filled with an ultraviolet-curable resin (adhesive) 19. The resin 19 comprises a silicone-based resin such that its refractive index is essentially the same as the refractive index of the cores 40 of the optical fibers 15 and the refractive index of the quartz substrate 54 of the filter member 20.

As shown in FIG. 2, the PD array 28 is of a structure for detecting light applied to its reverse side. An anisotropic conductive paste 58, rather than an Au solder or electrode or a silver paste, is disposed on an upper surface of the active layer 26 (which faces the submount 30). From the standpoint of crosstalk, the region on the upper surface of the active layer 26 should preferably be of a material having low reflectance, such as the anisotropic conductive paste 58, air, or the like, rather than a material having high reflectance, such as Au or the like. The PD array 28 may be a PD array for detecting light applied to its face side.

The photodetector area (active layer 26) of the PD array 28 for detecting light applied to its reverse side has a diameter of about 60 µm. The diameter of the photodetector area (active layer 26) should preferably be in the range from 40 to 80 µm. If the diameter is smaller than 40 µm, then since the size of the photodetector area (active layer 26) is too small, the efficiency with which the PD array 28 detects light is lowered. If the diameter is equal to or greater than 80 µm, then the PD array 28 tends to detect stray light, resulting in increased crosstalk.

The submount 30 is mounted in a structure in which the optical fiber 15, the PD array 28, and the submount 30 are arranged successively. If the submount 30 is mounted in a structure in which the optical fiber 15, the submount 30, and the PD array 28 are arranged successively, then since the submount 30 is present between the optical fiber 15 and the PD array 28, the length of the optical path of the divided light 24 is increased, and the divided light 24 is spread greatly, posing disadvantages with respect to the efficiency with which the PD array 28 detects light and crosstalk. The submount 30 is made of $Al_2O_3$.

The PD array 28 for detecting light applied to its reverse side has anode and cathode electrodes disposed on its active layer 26 side (facing the submount 30). A common cathode electrode and anode electrodes of respective channels are patterned as an electrode pattern 60 of gold on the submount 30. Bumps 62 of gold are disposed in areas corresponding to the anode electrodes of respective channels and the cathode electrode, and the region on the active layer 26 is filled with the anisotropic conductive paste 58. The bumps 62 of gold serve the purpose of achieving reliable conduction and also the purpose of increasing the inter-electrode distance between the active layer 26 and the submount 30 to reduce stray light due to reflection and scattering in the areas. When heat is applied to the anisotropic conductive paste 58, a conductive material such as silver or the like in the anisotropic conductive paste 58 is attracted to the conductive areas such as the bumps 62 of gold, thereby providing conductivity only between the anisotropic conductive paste 58 and the electrode pattern 60 of gold.

The area of the lower surface of the submount 30, which corresponds to the active layer 26, is coated with SiN (not shown) for reducing reflection due to the refractive index difference.

The spacer 32 for determining the gap between the optical fiber array 16 and the PD array 28 is fixed to the mounting surface of the submount 30 by an ultraviolet-curable adhesive, for example.

As shown in FIG. 3, in the optical device 10A according to the first embodiment the surface of the filter member 20 on the multilayer film 56 is defined as a first surface 70, the surface of the filter member 20 on the quartz substrate 54 as a second surface 72, the inner wall surface of the slit 18 which faces the first surface 70 of the filter member 20 as a first inner wall surface 74, and the inner wall surface of the slit 18 which faces the second surface 72 of the filter member 20 as a second inner wall surface 76. One or more of the first inner wall surface 74, the second inner wall surface 76, and the second surface 72 of the filter member 20 do not lie parallel to the first surface 70 of the filter member 20. "Two surfaces which do not lie parallel to each other" means that "the angle between the two surfaces is 0.5° or greater"

Specifically, according to the first embodiment, a line segment which is formed when the first surface 70 of the filter member 20 and a vertical plane including the optical axis of the signal light 22 cross each other is defined as a first line segment 80, a line segment which is formed when the second surface 72 of the filter member 20 and the vertical plane cross each other as a second line segment 82, a line segment which is formed when the first inner wall surface 74 of the slit 18 and the vertical plane cross each other as a third line segment 84, and a line segment which is formed when the second inner wall surface 76 of the slit 18 and the vertical plane cross each other as a fourth line segment 86. The first line segment 80 and the second line segment 82 do not lie parallel to each other, the third line segment 84 and the fourth line segment 86 do not lie parallel to each other, and the first line segment 80 and the third line segment 84 do not lie parallel to each other. The tilt angle α of the slit 18 and the tilt angle β of the first line segment 80 (the angle formed between the first line segment 80 and the vertical line) are related as α<β. The PD array 28 (see FIG. 2) is disposed on the optical path of the light 24 reflected from the surface (the first surface 70) of the multilayer film 56 of the filter member 20.

Light 90 reflected by the first inner wall surface 74 of the slit 18 (the interface between the first inner wall surface 74 of the slit 18 and the resin 19), light 92 reflected by the second inner wall surface 76 of the slit 18 (the interface between the second inner wall surface 76 of the slit 18 and the resin 19), and light 94 reflected by the second surface 72 of the filter member 20 (the interface between the quartz substrate 54 and the resin 19) are emitted in respective directions which are different from the direction in which the light 24 reflected by the first surface 70 of the filter member 20 (the interface between the multilayer film 56 of the filter member 20 and the resin 19) is emitted. Therefore, the interference of the reflected light (divide light) 24 with the other reflected lights 90, 92, 94 is reduced. The reduced interference leads to an improvement in the reliability of the monitoring function to monitor the signal light 22.

Some modifications of the optical device 10A according to the first embodiment will be described below with reference to FIGS. 4 through 12.

Figure 4:
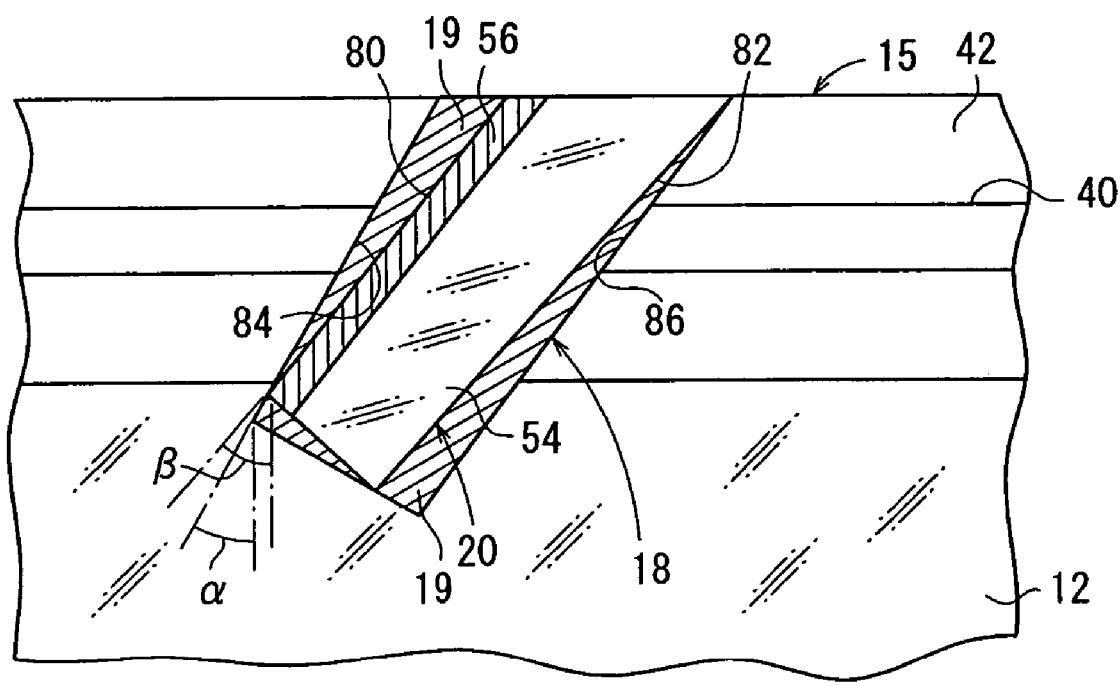
FIG. 4 is an enlarged fragmentary cross-sectional view of a first modification of the optical device according to the first embodiment.

As shown in FIG. 4, an optical device 10Aa according to a first modification is of substantially the same structure as the optical device 10A according to the first embodiment, but differs therefrom in that the first line segment 80 of the filter member 20 and the second line segment 82 of the filter member 20 lie parallel to each other, the third line segment 84 of the slit 18 and the fourth line segment 86 of the slit 18 lie parallel to each other, and the first line segment 80 of the filter member 20 and the third line segment 84 of the slit 18 do not lie parallel to each other.

Figure 5:
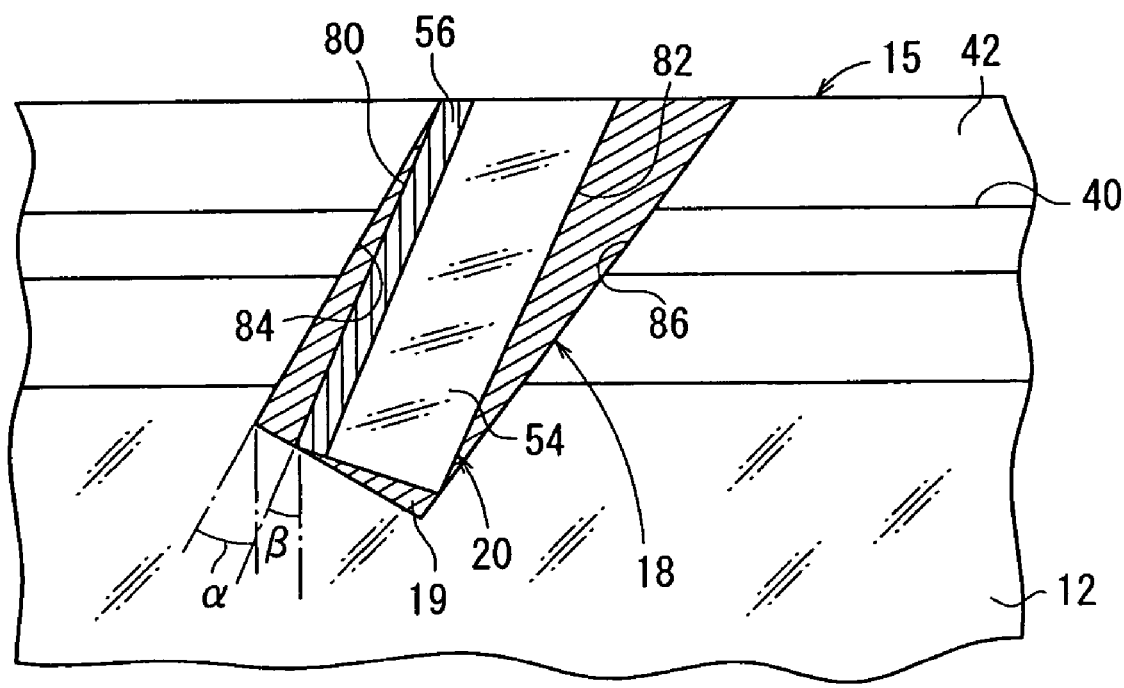
FIG. 5 is an enlarged fragmentary cross-sectional view of a second modification of the optical device according to the first embodiment.

As shown in FIG. 5, an optical device 10Ab according to a second modification is of substantially the same structure as the optical device 10Aa according to the first modification, but differs therefrom in that the tilt angle α of the slit 18 and the tilt angle β of the first line segment 80 are related as α>β.

Figure 6:
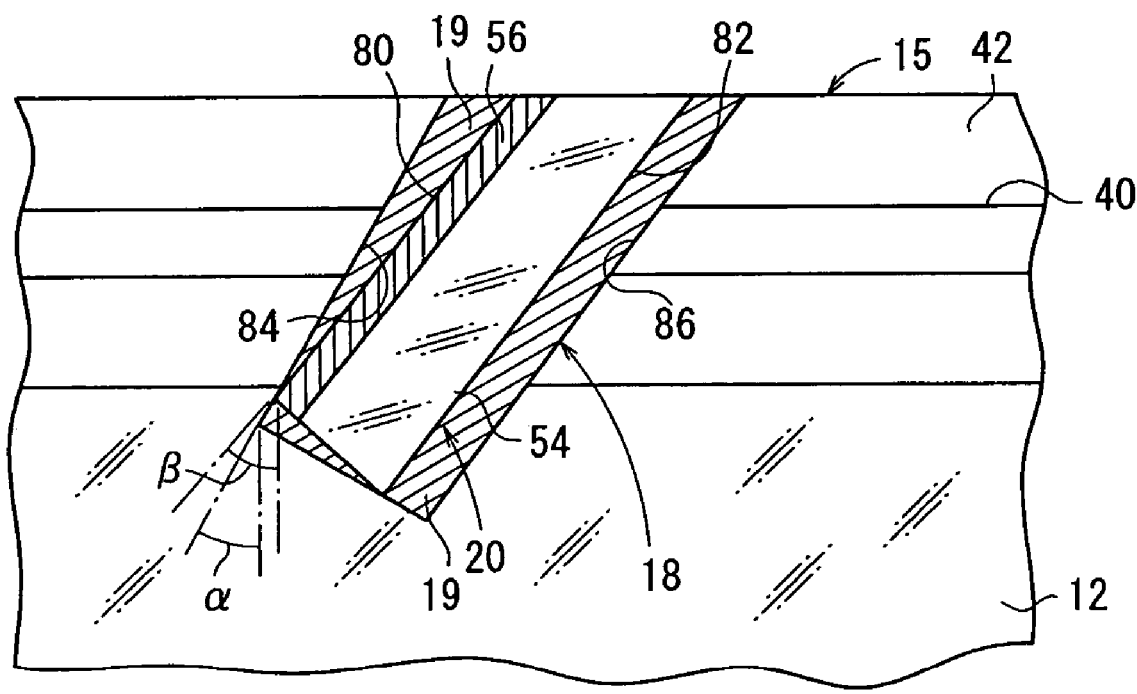
FIG. 6 is an enlarged fragmentary cross-sectional view of a third modification of the optical device according to the first embodiment.

As shown in FIG. 6, an optical device 10Ac according to a third modification is of substantially the same structure as the optical device 10Aa according to the first modification, but differs therefrom in that the first line segment 80 of the filter member 20 and the second line segment 82 of the filter member 20 do not lie parallel to each other.

Figure 7:
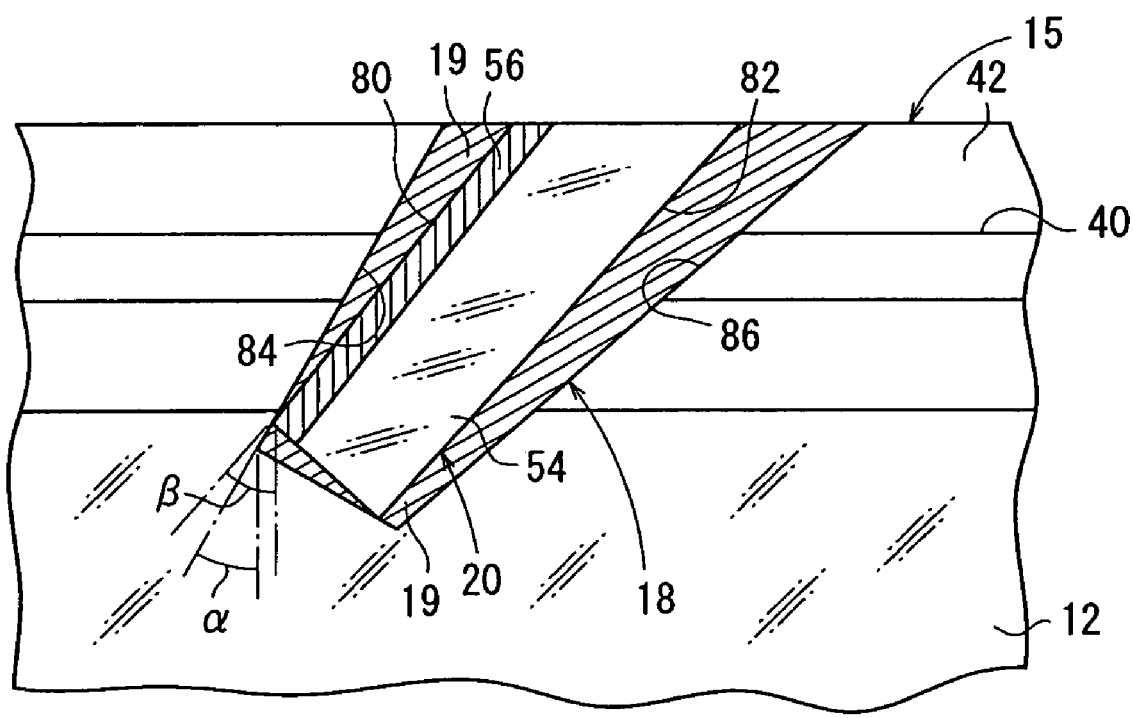
FIG. 7 is an enlarged fragmentary cross-sectional view of a fourth modification of the optical device according to the first embodiment.

As shown in FIG. 7, an optical device 10Ad according to a fourth modification is of substantially the same structure as the optical device 10Aa according to the first modification, but differs therefrom in that the third line segment 84 of the slit 18 and the fourth line segment 86 of the slit 18 do not lie parallel to each other.

Figure 8:
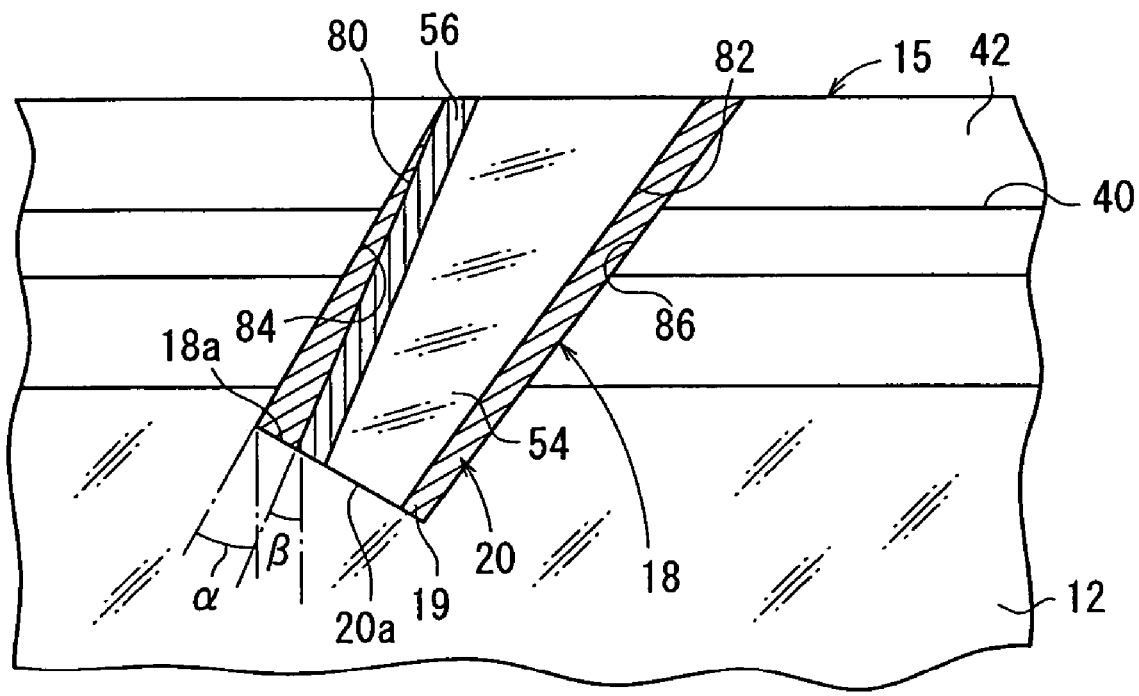
FIG. 8 is an enlarged fragmentary cross-sectional view of a fifth modification of the optical device according to the first embodiment.

As shown in FIG. 8, an optical device 10Ae according to a fifth modification is of substantially the same structure as the optical device 10Ac according to the third modification, but differs therefrom as follows:

The tilt angle α of the slit 18 and the tilt angle β of the first line segment 80 are related as α>β. The filter member 20 has a bottom surface 20a held in contact with a bottom 18a of the slit 18. Since the filter member 20 can be kept at a desired angle β simply by holding the bottom surface 20a of the filter member 20 in contact with the bottom 18a of the slit 18, the optical device 10Ae can easily be assembled.

Figure 9:
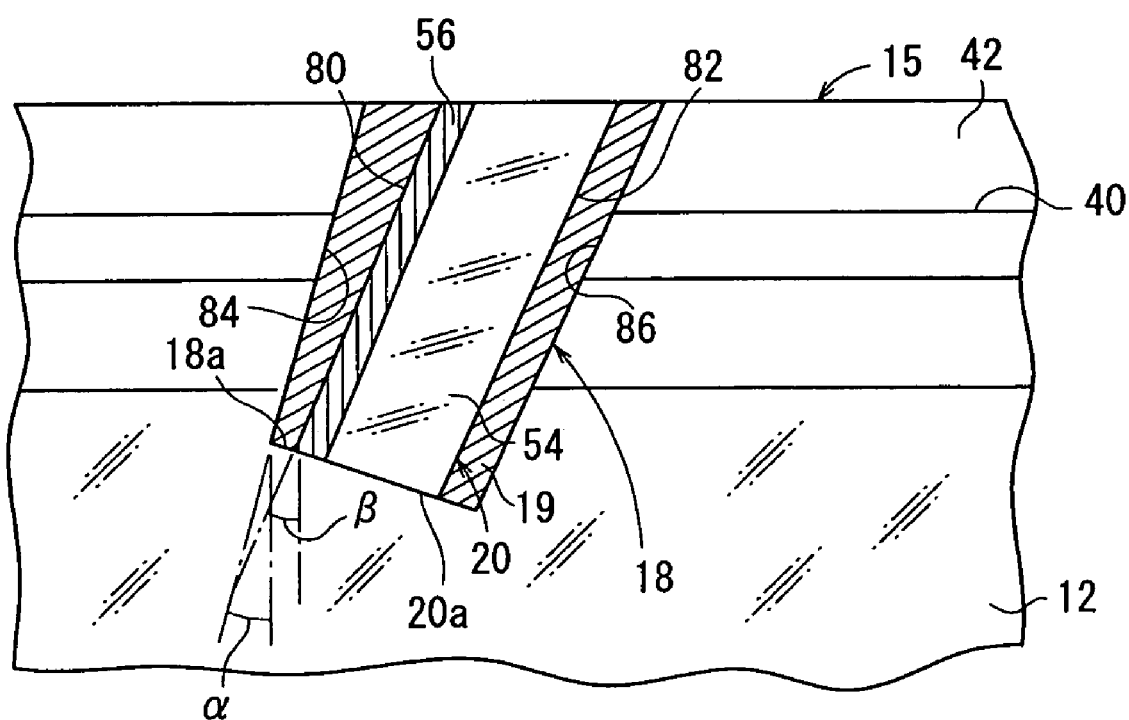
FIG. 9 is an enlarged fragmentary cross-sectional view of a sixth modification of the optical device according to the first embodiment.

As shown in FIG. 9, an optical device 10Af according to a sixth modification is of substantially the same structure as the optical device 10Ae according to the fifth modification, but differs therefrom in that the first line segment 80 and the second line segment 82 of the filter member 20 and the fourth line segment 86 of the slit 18 lie parallel to each other, and the bottom surface 20a of the filter member 20 is held in contact with the bottom 18a of the slit 18.

Figure 10:
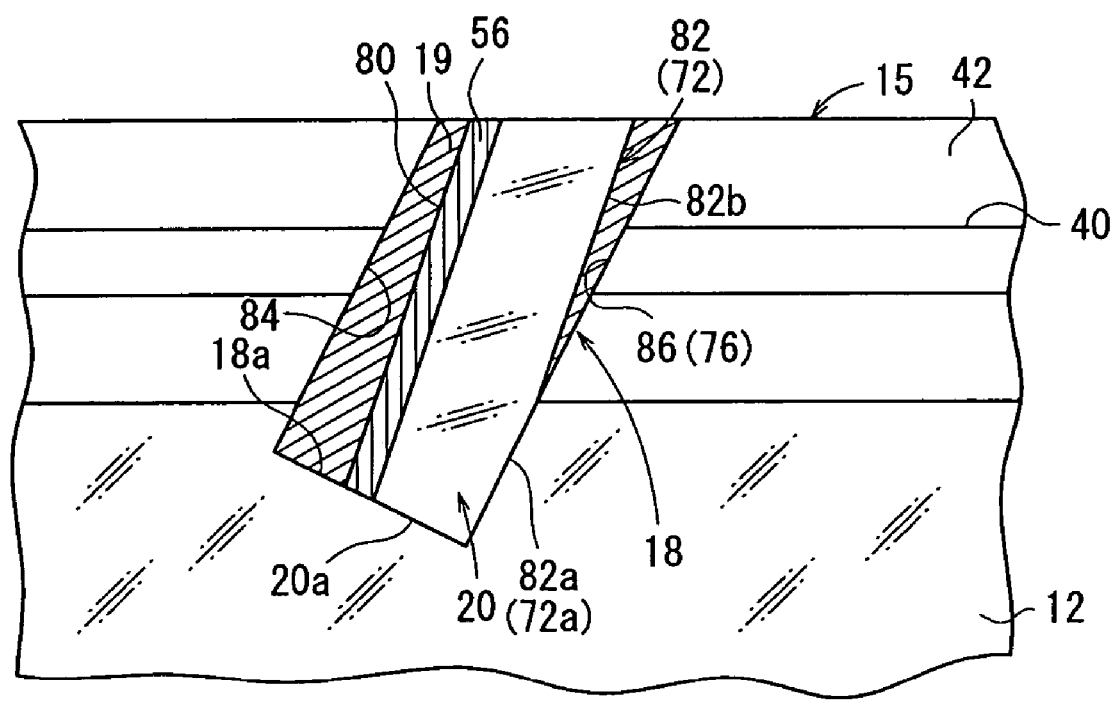
FIG. 10 is an enlarged fragmentary cross-sectional view of a seventh modification of the optical device according to the first embodiment.

As shown in FIG. 10, an optical device 10Ag according to a seventh modification is of substantially the same structure as the optical device 10Ab according to the second modification, but differs therefrom as follows:

The angle of a portion of the second line segment 82 of the filter member 20 which extends from the bottom surface 20a and terminates short of a region corresponding to the core 40 of the optical fiber 15 (a lower portion 82a of the second line segment 82), and the angle of a portion of the second line segment 82 including the region corresponding to the core 40 of the optical fiber 15 (an upper portion 82b of the second line segment 82) are different from each other. That is, the second surface 72 of the filter member 20 is bent at a point thereon.

The third line segment 84 and the fourth line segment 86 of the slit 18 lie parallel to each other. The angle of the lower portion 82a of the second line segment 82 of the filter member 20 is substantially the same as the angle of the fourth line segment 86 of the slit 18. The upper portion 82b of the second line segment 82 of the filter member 20 and the first line segment 80 of the filter member 20 lie parallel to each other. The bottom surface 20a of the filter member 20 is held in contact with the bottom 18a of the slit 18.

Specifically, the optical device 10Ag is of such a structure that the bent surface made up of the bottom 18a of the slit 18 and the second inner wall surface 76 is contacted by the bent surface made up of the bottom surface 20a of the filter member 20 and a lower surface 72a of the second surface 72 (a surface corresponding to the lower portion 82a of the second line segment 82).

When the filter member 20 is inserted into the slit 18 in order to assemble the optical device 10Ag, the filter member 20 can provisionally be easily secured within the slit 18 at a desired angle simply by aligning the bent surface of the filter member 20 with the bent surface of the slit 18. Therefore, the subsequent assembling process will be facilitated.

Figure 11:
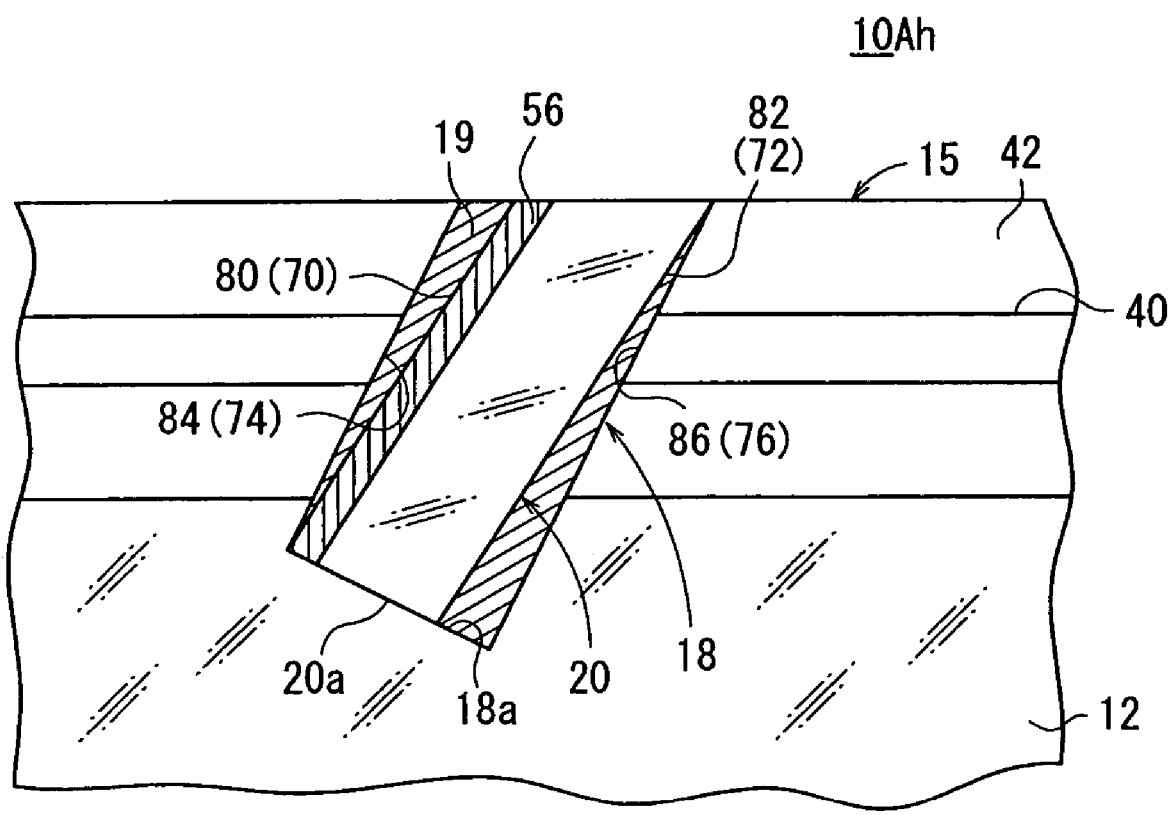
FIG. 11 is an enlarged fragmentary cross-sectional view of an eighth modification of the optical device according to the first embodiment.

As shown in FIG. 11, an optical device 10Ah according to an eighth modification is of substantially the same structure as the optical device 10Ag according to the seventh modification, but differs therefrom as follows:

The first line segment 80 and the second line segment 82 of the filter member 20 lie parallel to each other. The bottom surface 20a of the filter member 20 is held in contact with the bottom 18a of the slit 18. The lower end of the first surface 70 of the filter member 20 is held in contact with the lower end of the first inner wall surface 74 of the slit 18, and the upper end of the second surface 72 of the filter member 20 is held in contact with the upper end of the second inner wall surface 76 of the slit 18.

As with the optical device 10Ag according to the seventh modification, for assembling the optical device 10Af, when the filter member 20 is inserted into the slit 18 to bring the bottom surface 20a of the filter member 20 into contact with the bottom 18a of the slit 18, the filter member 20 can provisionally be easily secured within the slit 18 at a desired angle simply. Therefore, the subsequent assembling process will be facilitated.

Figure 12:
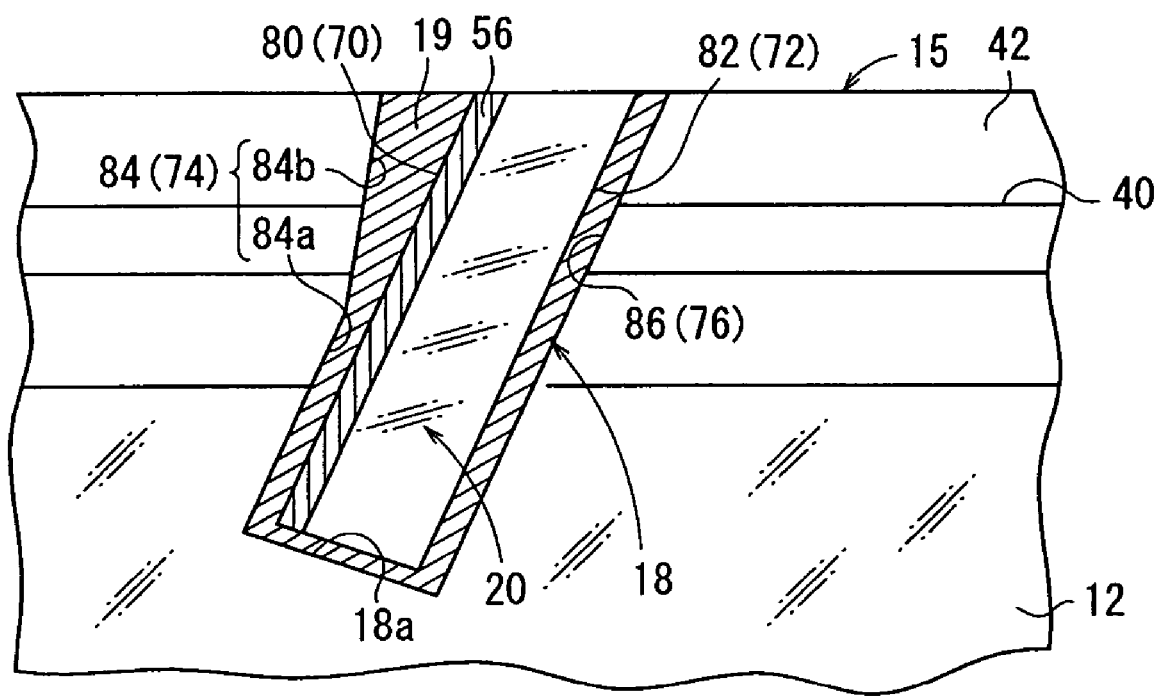
FIG. 12 is an enlarged fragmentary cross-sectional view of a ninth modification of the optical device according to the first embodiment.

As shown in FIG. 12, an optical device 10Ai according to a ninth modification is of substantially the same structure as the optical device 10Af according to the sixth modification, but differs therefrom as follows:

The angle of a portion of the third line segment of the slit 18 which extends from the bottom 18a and terminates short of a region corresponding to the core 40 of the optical fiber 15 (a lower portion 84a of the third line segment 84), and the angle of a portion of the third line segment 84 including the region corresponding to the core 40 of the optical fiber 15 (an upper portion 84b of the third line segment 84) are different from each other. That is, the first inner wall surface 74 of the filter member 20 is bent at a point thereon.

The optical device 10Ai according to the ninth modification can be produced simply by cutting from above into the first inner wall surface 74 of the slit 18 in a conventionally proven structure wherein the first surface 70 and the second surface 72 of the filter member 20 and the first inner wall surface 74 and the second inner wall surface 76 of the slit 18 lie substantially parallel to each other. The optical device 10Ai according to the ninth modification can be produced more easily than the optical devices 10Aa through 10Ah according to the first through eighth modifications, and the angle difference between the slit 18 and the filter member 20 can freely be changed. The optical device 10Ai can quickly be reconfigured to meet changes in specifications, etc.

As with the optical device 10A according to the first embodiment, the optical devices 10Aa through 10Ai according to the first through ninth modifications are capable of reducing the interference of the reflected light 24 from the first surface 70 of the filter member 20 with the other reflected lights 90, 92, 94, and improving the reliability of the monitoring function to monitor the signal light 22.

An optical device 10B according to a second embodiment will be described below with reference to FIG. 13.

Figure 13:
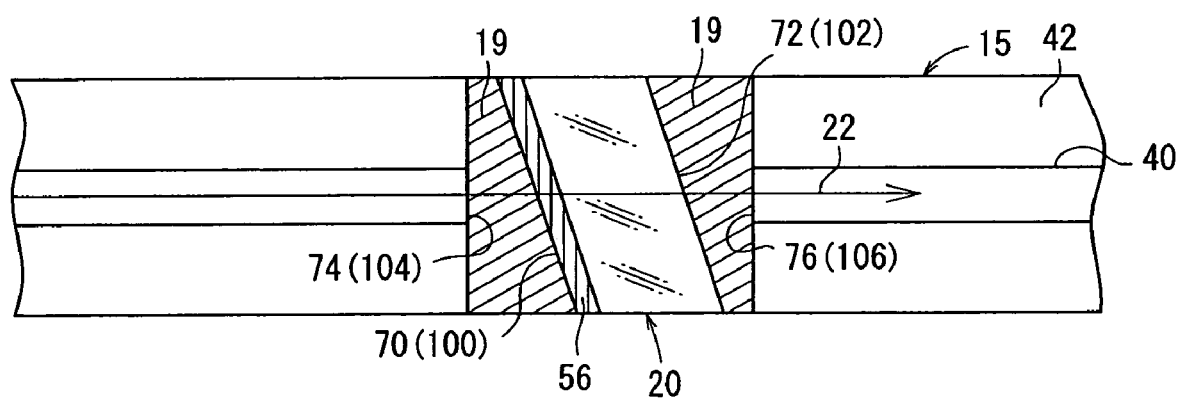
FIG. 13 is an enlarged fragmentary cross-sectional view of an optical device according to a second embodiment.

In the optical device 10B according to the second embodiment, as shown in FIG. 13, a line segment which is formed when the first surface 70 of the filter member 20 and a horizontal plane including the optical axis of the signal light 22 cross each other is defined as a fifth line segment 100, a line segment which is formed when the second surface 72 of the filter member 20 and the horizontal plane cross each other as a sixth line segment 102, a line segment which is formed when the first inner wall surface 74 of the slit 18 and the horizontal plane cross each other as a seventh line segment 104, and a line segment which is formed when the second inner wall surface 76 of the slit 18 and the horizontal plane cross each other as an eighth line segment 106. The seventh line segment 104 and the eighth line segment 106 lie parallel to each other, and the fifth line segment 100 and the seventh line segment 104 do not lie parallel to each other.

As with the optical device 10A according to the first embodiment, the optical device 10B according to the second embodiment is capable of reducing the interference of the reflected light 24 (see FIG. 2) from the first surface 70 of the filter member 20 with the other reflected lights 90, 92, 94, and increasing the reliability of the monitoring function to monitor the signal light 22.

According to the second embodiment, only the fifth line segment 100 and the seventh line segment 104 may not lie parallel to each other, with no concern over the relationship of other line segments. For example, the fifth line segment 100 and the sixth line segment 102 may or may not lie parallel to each other, and the fifth line segment 100 and the eighth line segment 106 may or may not lie parallel to each other. Similarly, the sixth line segment 102 and the seventh line segment 104 may or may not lie parallel to each other, and the sixth line segment 102 and the eighth line segment 106 may or may not lie parallel to each other.

An optical device 10C according to a third embodiment will be described below with reference to FIG. 14.

Figure 14:
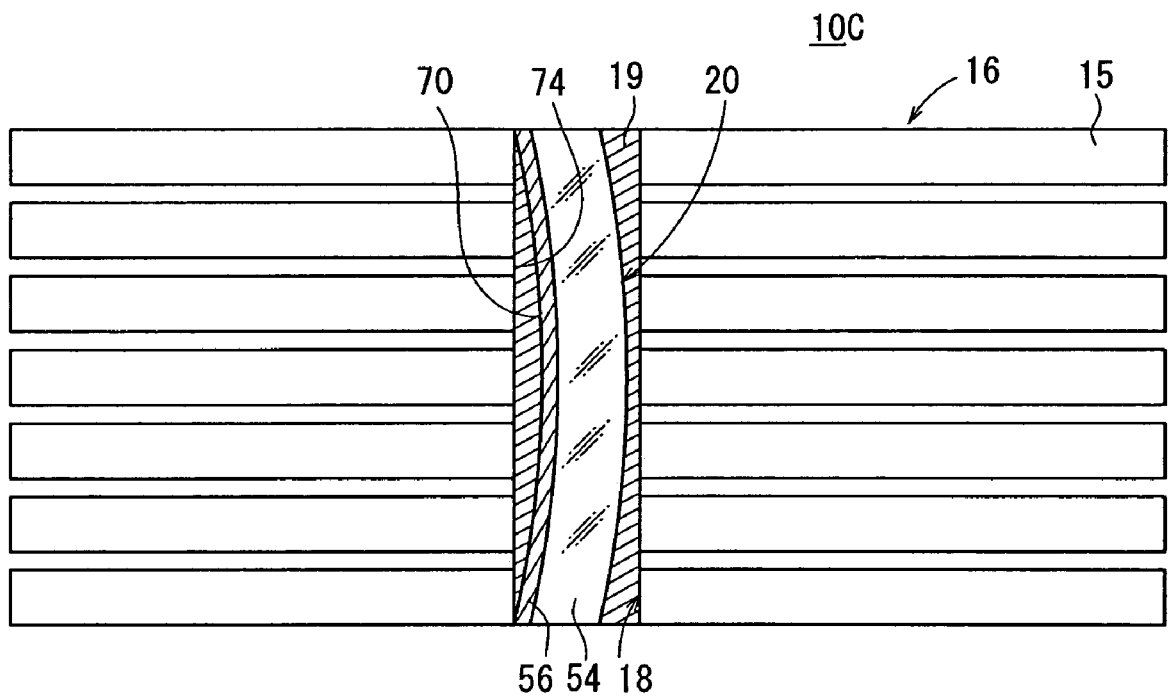
FIG. 14 is an enlarged fragmentary cross-sectional view of an optical device according to a third embodiment.

As shown in FIG. 14, the optical device 10C according to the third embodiment is of substantially the same structure as the optical device 10A according to the first embodiment. In particular, one common slit 18 is formed in and across an optical fiber array 16 comprising seven optical fibers 15, for example, and one filter member 20 is inserted in the slit 18, with the gap between the slit 18 and the filter member 20 within the slit 18 being filled with a resin 19.

The surface (first surface) 70 of the filter member 20 which confronts at least the first inner wall surface 74 of the slit 18 is curved concavely toward the first inner wall surface 74. The first surface 70 is curved to such an extent that difference between the central portion of the filter member 20 and the opposite ends thereof ranges from 5 μm to 100 μm. If the difference is smaller than 5 μm, then it is difficult to provide a desired angle difference, and if the difference is greater than 100 μm, then it is difficult to insert the filter member 20.

In the optical device 10C according to the third embodiment, the surface (first inner wall surface) 74 of the slit 18 which confronts the filter member 20 and the surface (first surface) 70 of the filter member 20 which confronts the first inner wall surface 74 of the slit 18 do not lie parallel to each other, and the first surface 70 and the second surface 72 of the filter member 20 do not lie parallel to each other. Therefore, the optical device 10C is capable of reducing the interference of the reflected light 24 from the multilayer film 56 of the filter member 20 with the other reflected lights 90, 92, 94, and increasing the reliability of the monitoring function to monitor the signal light 22.

The filter member 20 can easily be curved by the multilayer film 56 formed on the surface of the quartz substrate 54. Specifically, when the multilayer film 56 is formed, it exerts stresses to the quartz substrate 54, causing the quartz substrate 54 to be bent concavely at its surface on which the multilayer film 56 is formed. The curvature may be adjusted depending on the materials and thicknesses of the layers of the multilayer film 56 and the number of the layers of the multilayer film 56.

According to another process, the quartz substrate 54 may be curved by changing the finishing accuracies (e.g., polishing rates) of the face and reverse sides of the quartz substrate 54. The finishing accuracy of the face side of the quartz substrate 54 on which the multilayer film 56 is formed may be increased (to a finishing level of ▽▽▽, for example) and the finishing accuracy of the reverse side of the quartz substrate 54 on which the multilayer film 56 is formed may be reduced (to a finishing level of ▽▽, for example).

According to still another process, the quartz substrate 54 may also be curved by applying air to the face and reverse sides of the quartz substrate 54 and changing the rates of air applied to the face and reverse sides of the quartz substrate 54 when the quartz substrate 54 is refined. If the rate of air applied to the face side of the quartz substrate 54 is greater than the rate of air applied to the reverse side of the quartz substrate 54, then compressive stresses produced on the face side of the quartz substrate 54 are greater than compressive stresses produced on the reverse side of the quartz substrate 54 when the quartz substrate 54 is refined. When the refinement of the quartz substrate 54 is finished, the quartz substrate 54 has its face side (the surface on which the multilayer film 56 is formed) curved concavely.

An optical device 10D according to a fourth embodiment will be described below with reference to FIG. 15.

Figure 15:
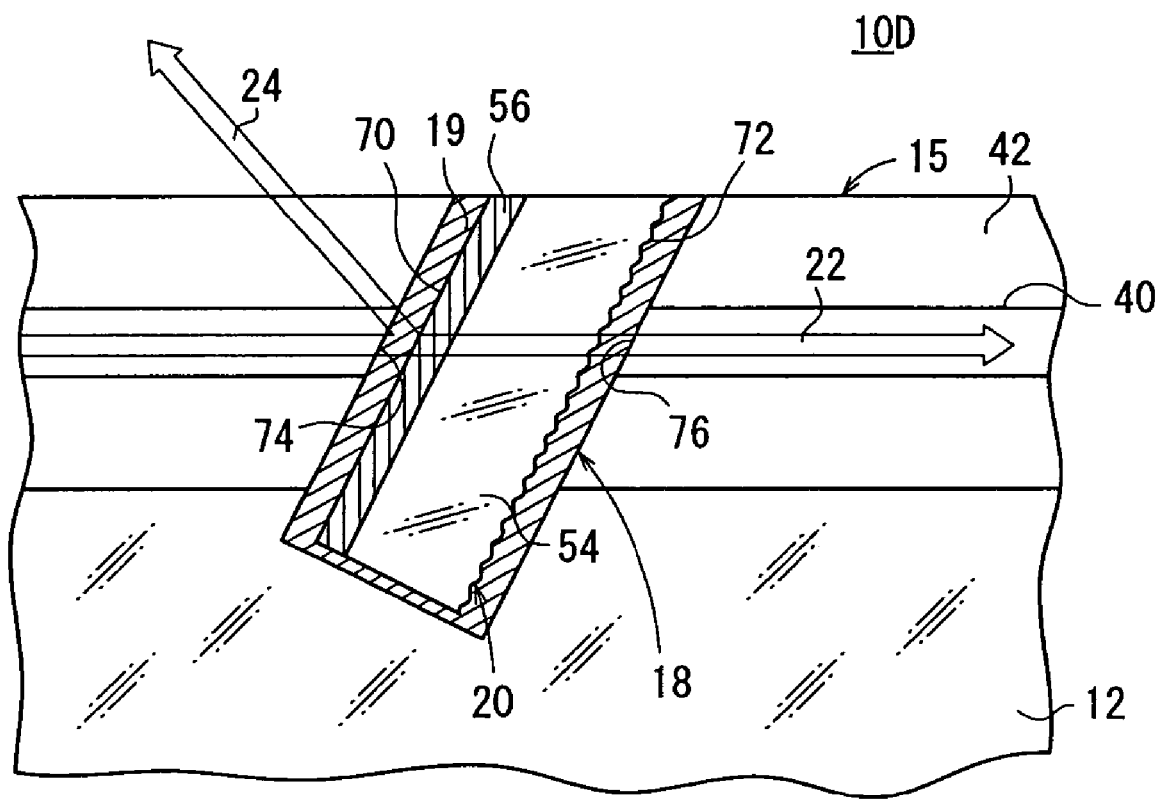
FIG. 15 is an enlarged fragmentary cross-sectional view of an optical device according to a fourth embodiment.
Figure 16:
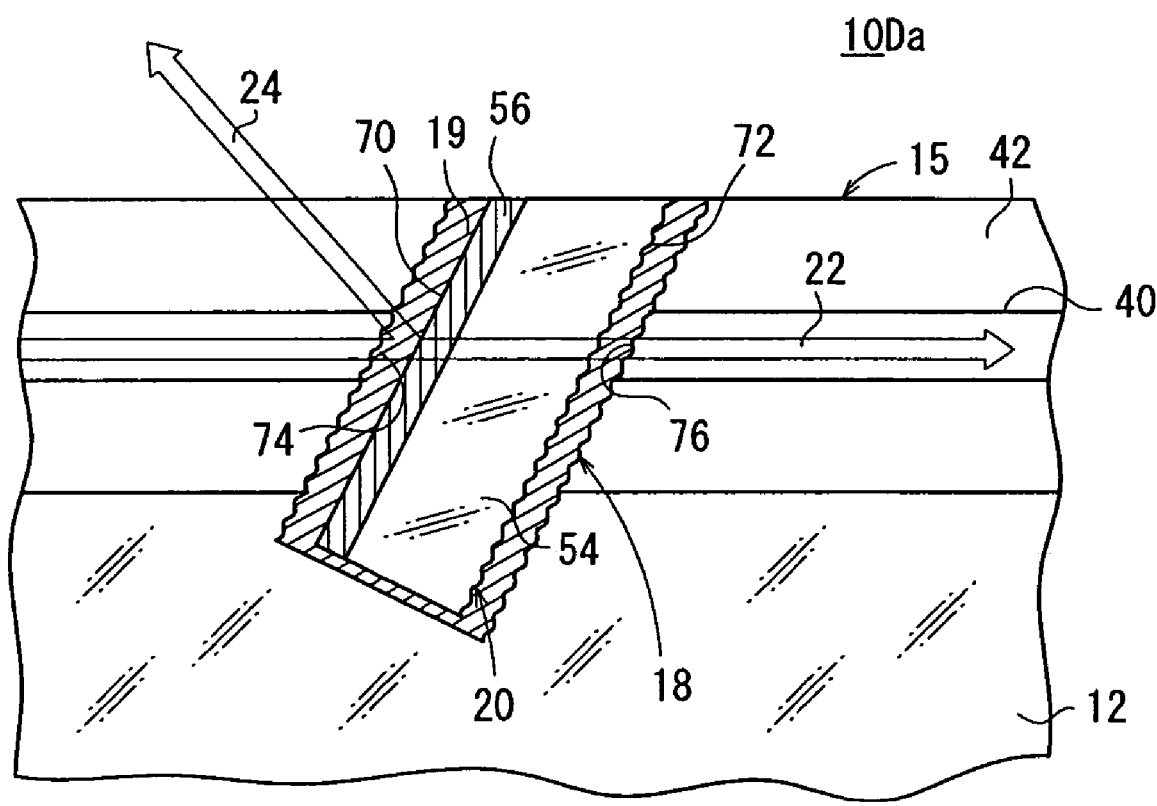
FIG. 16 is an enlarged fragmentary cross-sectional view of a modification of the optical device according to the fourth embodiment.

As shown in FIG. 15, the optical device 10D according to the fourth embodiment is of substantially the same structure as the optical device 10A according to the first embodiment, but differs therefrom in that the first surface 70 of the filter member 20, the first inner wall surface 74 of the slit 18, and the second inner wall surface 76 of the slit 18 lie parallel to each other, and the second surface 72 (the reverse side of the quartz substrate 54) of the filter member 20 comprises a rough surface.

The first surface 70 of the filter member 20 and the first inner wall surface 74 of the slit 18 may not lie parallel to each other.

Usually, light reflected from the first surface 70 (the face side of the multilayer film 56) of the filter member 20 suffers strong interference with light reflected from the second surface 72 of the filter member 20 due to, for example, the thickness of the filter member 20. The interference with light reflected from the first inner wall surface 74 of the slit 18 and light reflected from the second inner wall surface 76 of the slit 18 is smaller than the interference with light reflected from the second surface 72.

According to the third embodiment, since the second surface 72 of the filter member 20 comprises a rough surface, the reflected light from the second surface 72 of the filter member 20 is randomly emitted as scattered light. Consequently, the interference of the reflected light from the second surface 72 with the reflected light from the second surface 72 of the filter member 20 is effectively reduced, and the reliability of the monitoring function to monitor the signal light 22 is efficiently improved.

The reverse side of the quartz substrate 54 may be roughened by polishing the quartz substrate 54 with a grinding stone having a small grain size when the quartz substrate 54 is processed. Preferably, the reverse side of the quartz substrate 54 may be roughened by etching it with a chemical such as hydrofluoric acid or the like. Furthermore, the reverse side of the quartz substrate 54 may be roughened by melting a laser processing fiber to change a surface state or applying a laser to change only a core region.

If the quartz substrate 54 is fabricated by spin coating, then surface irregularities of the spin coater can be transferred to the reverse side of the quartz substrate 54.

If the quartz substrate 54 is fabricated by a glass press, then a portion of the die for forming the reverse side of the quartz substrate 54 may be roughened in advance. When the pressing process is finished, the rough surface of the die is transferred to the reverse side of the quartz substrate 54.

With the optical device 10D according to the fourth embodiment, only the second surface 72 of the filter member 20 is roughened. In an optical device 10Da according to a modification shown in FIG. 16, both the first inner wall surface 74 and the second inner wall surface 76 of the slit 18 are rough. Since light reflected from the first inner wall surface 74 of the slit 18 and light reflected from the second inner wall surface 76 of the slit 18 are scattered light, the interference with light reflected from the first surface 70 of the filter member 20 is further reduced.

Figure 17:
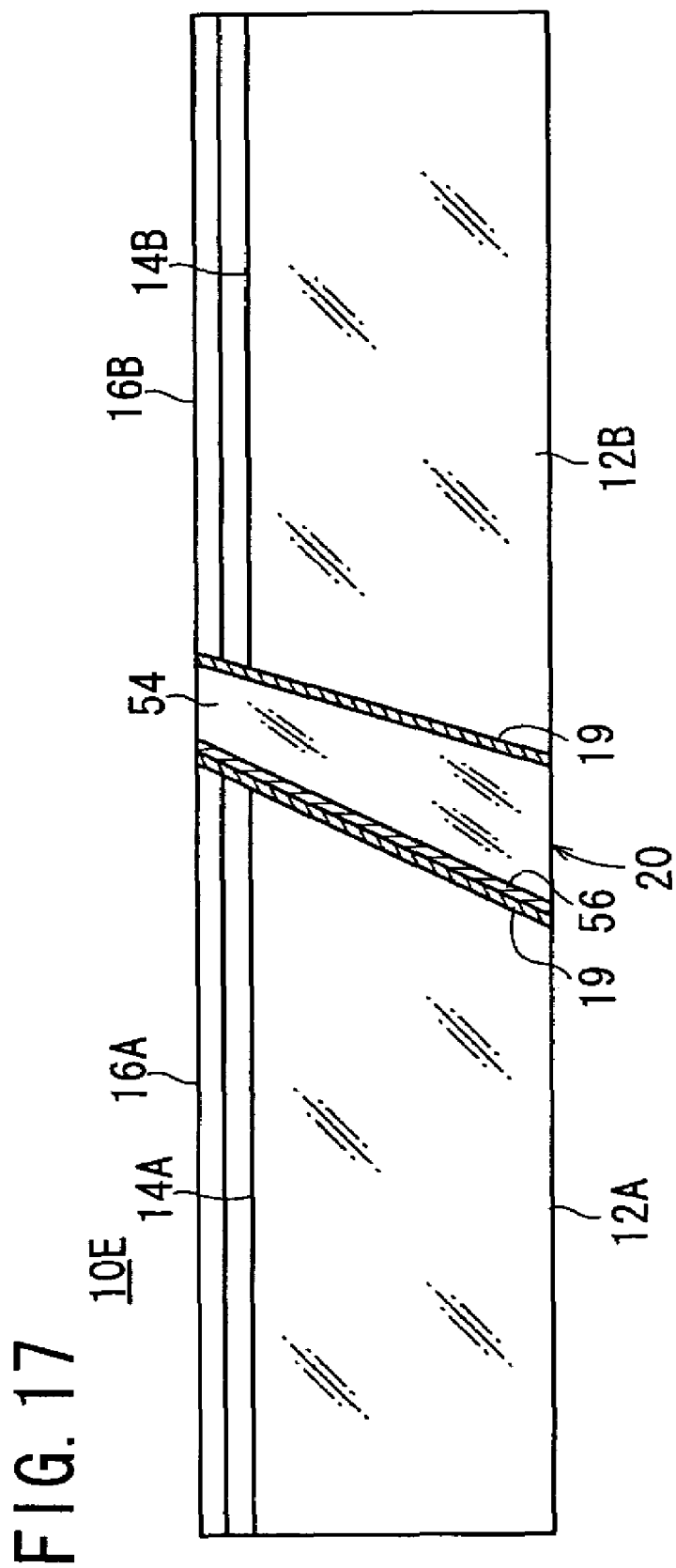
FIG. 17 is an enlarged fragmentary cross-sectional view of an optical device according to a fifth embodiment.
Figure 18:
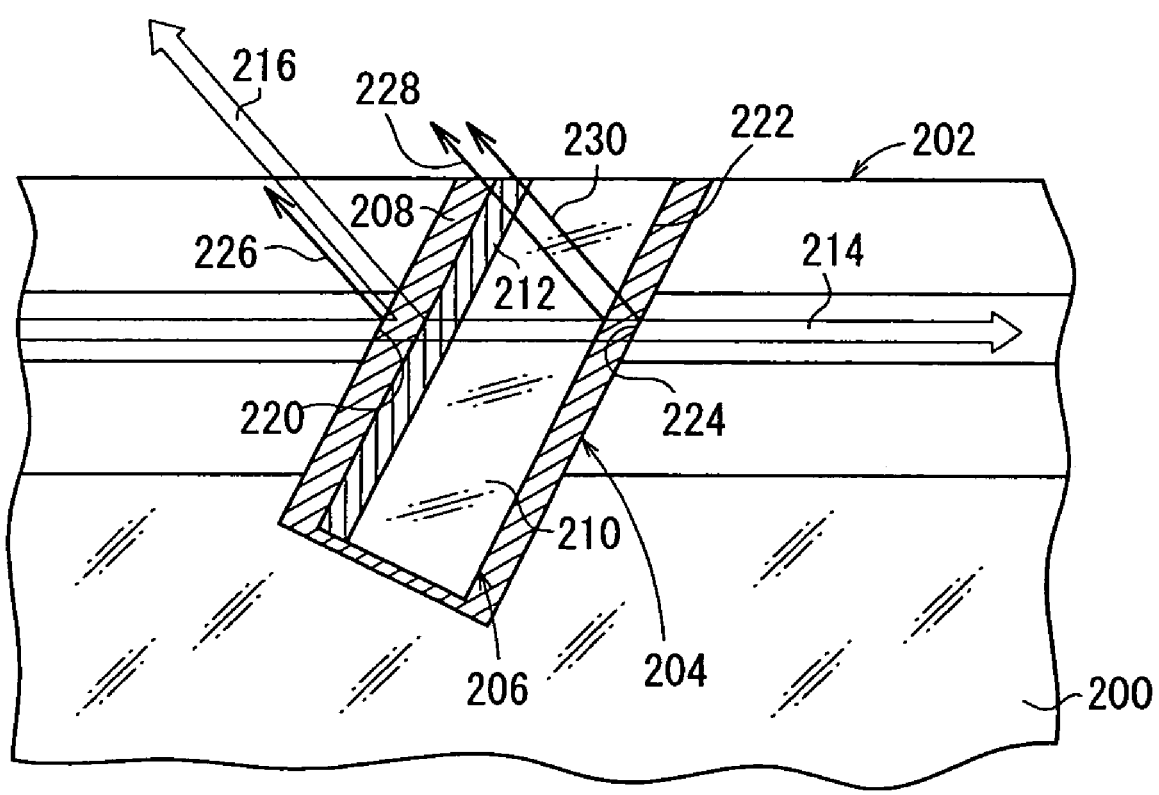
FIG. 18 is an enlarged fragmentary cross-sectional view of a conventional optical device.

In an optical device 10E according to a fifth embodiment shown in FIG. 17, an end face of a first glass substrate 12A having a V-shaped groove 14A in which a first optical fiber array 16A is fixed, an end face of a second glass substrate 12B having a V-shaped groove 14B in which a second optical fiber array 16B is fixed, an end face of the first optical fiber array 16A, and an end face of the second optical fiber array 16B are bonded through a dividing member 20. The first optical fiber array 16A and the second optical fiber array 16B are centrally aligned with each other and fixed in the respective V-shaped grooves 14A, 14B in the first and second glass substrates. According to the fifth embodiment, unlike the optical devices 10A through 10D according to the first through fourth embodiments, there is no need to take into account the problem of a reduction in the mechanical strength of the glass substrate 12 which occurs when the depth of the slit 18 is increased.

The optical devices 10A through 10E according to the first through fifth embodiments are applied to the optical fiber array 16 comprising the plural optical fibers 15. The optical devices 10A through 10E according to the first through fifth embodiments are also applicable to an optical waveguide array having a plurality of optical waveguides formed in an LN substrate, for example.

An inventive example of the optical device 10A according to the first embodiment will be described below. First, a glass substrate 12 for use in an in-line optical fiber array 16 was fabricated by a grinding process.

The glass substrate 12 was made of borosilicate glass (particularly, Pyrex (registered trademark) glass material was used). The glass substrate 12 had a size represented by a length of 16 mm and a thickness of 1 mm. 12 V-shaped grooves 14 for holding the optical fiber array 16 were formed at a pitch of 250 μm to a depth of about 90 μm by a grinding process.

Then, the optical fiber array 16 was assembled. The optical fiber array 16 comprised a 12-core ribbon fiber assembly having a pitch of 250 μm. The tape was peeled off from the 12-core ribbon fiber assembly to provide a peeled region having a length of 12 mm, and the optical fibers were placed in the V-shaped groove 14 in the glass substrate 12 and fixed in place by an ultraviolet-curable resin adhesive.

Then, the slit 18 was formed in and across the optical fiber array 16. The slit 18 had a width of 30 μm, a depth of 200 μm, and a tilt angle α of 20°.

Then, the filter member 20 was fabricated. The multilayer film 56 made of a selected one of tantalum oxide, quartz, alumina, titanium oxide, etc. was formed on the quartz substrate 54 by evaporation, and the quartz substrate 54 with the multilayer film 56 formed thereon was machined into a size having a thickness of 20 μm, a length of 5 mm, and a width of 200 μm, thereby fabricating the filter member 20. The filter member 20 had a designed tilt angle of 20°, a division ratio represented by a transmittance of 93% and a reflectance of 7%.

Thereafter, the filter member 20 was inserted into the slit 18, and adjusted on a positioning stage such that the first surface 70 of the filter member 20 had a tilt angle β ranging from 20.5° to 21° with respect to the optical axis. With the filter member 20 fixed at the tilt angle β, the slit 18 was filled with the resin 19. The resin 19 was a silicone-based resin such that its refractive index is essentially the same as the refractive index of the cores 40 of the optical fibers 15. After the slit 18 was filled with the resin 19, the resin 19 was cured.

Thereafter, the PD array 28 was mounted on the submount 30. The PD array 28 had 12 channels, and had a height of 150 μm, a width of 420 μm, and a length of 3 mm.

The PD array 28 had a structure for detecting light applied to its reverse side, as with the optical device 10A according to the first embodiment. The area above the active layer 26 (which faces the submount 30) was filled with the anisotropic conductive paste 58.

Then, the PD array 28 was centrally aligned. Specifically, the spacer 32 for determining the gap between the optical fiber array 16 and the PD array 28 was installed on the submount 30.

The spacer 32 was made of borosilicate glass, particularly Pyrex (registered trademark) glass material. The gap length was set to 10 μm. Since the thickness of the PD array 28 including the bumps 62 of gold was 190 μm, the spacer 32 had a thickness of 200 μm.

While centrally aligning the PD array 28 in order to position the active layer 26 of the PD array 28 on the optical path of the reflected light 24 from the first surface 70 of the filter member 20, the submount 30 was mounted on the optical fiber array 16 with the spacer 32 interposed therebetween.

The optical device according to the inventive example was evaluated for measurements. The effect that the reflected light has due to the difference between refractive indexes manifests itself owing to characteristic changes in the light detection efficiency of the PD array 28 based on temperature changes and characteristic changes in the light detection efficiency of the PD array 28 after a high-temperature, high-humidity test. The inventive example and a comparative example were evaluated with respect to the above two points.

The comparative example had such a structure that the difference between the tilt angle α of the slit 18 and the tilt angle β of the first surface 70 of the filter member 20 was set to less than 0.5.

According to the comparative example, changes in the light detection efficiency due to temperature changes were about 0.5 dB, and changes in the light detection efficiency after a high-temperature, high-humidity test were also about 0.5 dB.

With the optical device according to the inventive example, both changes in the light detection efficiency due to temperature changes and changes in the light detection efficiency after a high-temperature, high-humidity test were about 0.1 dB, and hence almost no characteristic changes were observed.

The optical device according to the present invention is not limited to the above embodiments, but may have various arrangements without departing from the scope of the invention.

What is claimed is:

1. An optical device comprising:
   light transmitting means;
   a slit defined in said light transmitting means;
   a filter member inserted in said slit for dividing a portion of signal light propagated through said light transmitting means; and
   a resin filling a gap between said slit and said filter member within said slit;
   said filter member having a substrate and an optical thin film disposed on a principal surface of said substrate;
   wherein a surface of said filter member on said optical thin film is defined as a first surface, a surface of said filter member on said substrate as a second surface, an inner wall surface of said slit which faces said first surface of said filter member as a first inner wall surface, and an inner wall surface of said slit which faces said second surface of said filter member as a second inner wall surface, wherein one or more of said first inner wall surface and said second inner wall surface of said slit, and said second surface of said filter member do not lie parallel to said first surface of said filter member, and said first inner wall surface comprises two planar surfaces that form an angle with respect to one another.

2. An optical device according to claim 1, wherein an angle formed between said first surface of said filter member and said one or more of said first inner wall surface and second inner wall surface of said slit, and said second surface of said filter member is 0.5° or greater.

3. An optical device according to claim 1, wherein a line segment which is formed when said first surface of said filter member and a vertical plane including an optical axis of said signal light cross each other is defined as a first line segment, a line segment which is formed when said second surface of said filter member and said vertical plane cross each other as a second line segment, a line segment which is formed when said first inner wall surface of said slit and said vertical plane cross each other as a third line segment, and a line segment which is formed when said second inner wall surface of said slit and said vertical plane cross each other as a fourth line segment, one or more of said second line segment, said third line segment, and said fourth line segment do not lie parallel to said first line segment.

4. An optical device according to claim 3, wherein said first line segment and said second line segment do not lie parallel to each other, said third line segment and said fourth line segment do not lie parallel to each other, and said first line segment and said third line segment do not lie parallel to each other.

5. An optical device according to claim 3, wherein said first line segment and said second line segment lie parallel to each other, said third line segment and said fourth line segment lie parallel to each other, and said first line segment and said third line segment do not lie parallel to each other.

6. An optical device according to claim 3, wherein said first line segment and said second line segment do not lie parallel to each other, said third line segment and said fourth line segment lie parallel to each other, and said first line segment and said third line segment do not lie parallel to each other.

7. An optical device according to claim 3, wherein said first line segment and said second line segment lie parallel to each other, said third line segment and said fourth line segment do not lie parallel to each other, and said first line segment and said third line segment do not lie parallel to each other.

8. An optical device according to claim 1, wherein a line segment which is formed when said first surface of said filter member and a horizontal plane including an optical axis of said signal light cross each other is defined as a first line segment, a line segment which is formed when said second surface of said filter member and said horizontal plane cross each other as a second line segment, a line segment which is foxmed when said first inner wall surface of said slit and said horizontal plane cross each other as a third line segment, and a line segment which is formed when said second inner wall surface of said slit and said horizontal plane cross each other as a fourth line segment, one or more of said second line segment, said third line segment, and said fourth line segment do not lie parallel to said first line segment.

9. An optical device according to claim 8, wherein said third line segment and said fourth line segment lie parallel to each other, and said first line segment and said third line segment do not lie parallel to each other.

10. An optical device according to claim 1, wherein at least said filter member has a bottom surface partly held in contact with a bottom of said slit.

11. An optical device comprising:

light transmitting means;

a slit defined in said light transmitting means;

a filter member inserted in said slit for dividing a portion of signal light propagated through said light transmitting means; and a resin filling a gap between said slit and said filter member within said slit;

said filter member having a substrate and an optical thin film disposed on a principal surface of said substrate;

wherein a surface of said filter member on said optical thin film is defined as a first surface, a surface of said filter member on said substrate as a second surface, an inner wall surface of said slit which faces said first surface of said filter member as a first inner wall surface, and an inner wall surface of said slit which faces said second surface of said filter member as a second inner wall surface, wherein at least said second surface of said filter member comprises a rough surface, and said first inner wall surface comprises two planar surfaces that form an angle with respect to one another.

12. An optical device according to claim 11, wherein each of said first inner wall surface and said second inner wall surface of said slit comprise a rough surface.

13. An optical device according to claim 11, wherein said rough surface has a surface roughness Rt in the range of:

0.05 µm ≦ Rt ≦ 2 µm.

14. An optical device according to claim 11, wherein at least said filter member has a bottom surface partly held in contact with a bottom of said slit.

* * * * *